Dec. 13, 1955     C. T. PIEROTTI     2,726,887
PLUNGER CONNECTION FOR RECIPROCATING PUMPS
Filed Jan. 5, 1953
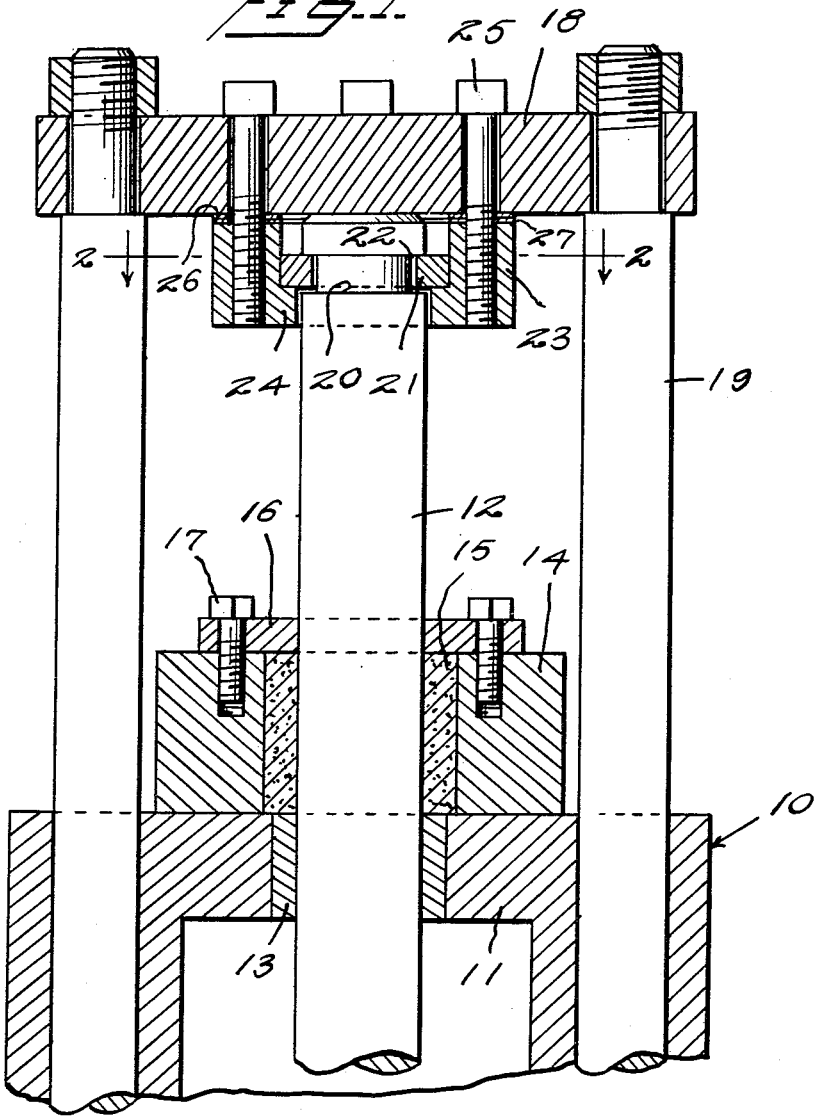
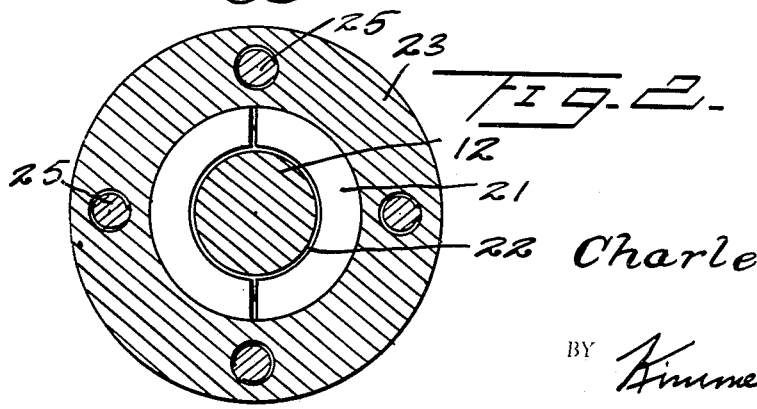
INVENTOR
Charles T. Pierotti
BY Kimmel & Crowell
ATTORNEYS United States Patent Office 2,726,887
Patented Dec. 13, 1955

2,726,887
PLUNGER CONNECTION FOR RECIPROCATING PUMPS

Charles T. Pierotti, Corry, Pa., assignor to Ajax Iron Works, Corry, Pa.

Application January 5, 1953, Serial No. 329,616

1 Claim. (Cl. 287—20)

This invention relates to hydraulic pumps.

In hydraulic pumps, particularly of the type embodying a reciprocating piston or plunger, the plunger is connected to a sliding crosshead either directly or by connecting rods attached through an outer crosshead or plate. At the present time the connection between the crosshead and plunger is a rigid connection, and it is found that slight inaccuracies in machining and assembly tend to produce a binding on the plunger, which in turn tends to cock and wear the plunger and related or adjacent parts.

It is, therefore, an object of this invention to provide in a pump construction an improved means for securing the plunger so that the plunger may align itself relative to the bushing bore in the cylinder and thereby eliminate any misalignment connection between the several connected or adjacent parts.

With the above and other objects in view, my invention consists in the arrangement, combination and details of construction disclosed in the drawings and specification, and then more particularly pointed out in the appended claim.

In the drawing—

Figure 1 is a fragmentary vertical section of a plunger and plunger connection for reciprocating pumps constructed according to an embodiment of this invention, Figure 2 is a sectional view taken on the line 2—2 of Figure 1.

Referring to the drawing, the numeral 10 designates generally a cylinder having a head portion 11 with a bushing 13 disposed centrally thereof, through which a plunger 12 slidably engages. A stuffing box 14 is disposed adjacent to the head portion 11, being secured thereto in any suitable manner, and a packing gland 15 is disposed in the stuffing box 14 about the plunger 12.

A gland confining and compressing plate 16 is secured by fastening means 17 to the upper or outer end of the stuffing box 14. An outer crosshead 18 is secured to the outer end of the plunger 12, as will be hereinafter described, and the outer crosshead 18 is secured to the outer ends of a pair of connecting rods 19 which are connected to a sliding crosshead (not shown) and of conventional construction in reciprocating pumps.

The outer end of the plunger 12 is formed with an annular groove or channel 20, within which a split ring 21 loosely engages. The inner diameter of the ring 21 is greater than the outer diameter of the bottom of the groove or channel 20, as indicated at 22, so that the split ring 21 may have radial movement with respect to the plunger 12.

A clamping ring 23 engages snugly about the split ring 21 and clamping ring 23 is formed with an annular flange 24 which bears against one side of the split ring 21. The clamping ring 23 is secured to the outer crosshead 18 by means of fastening devices 25. In the application of the clamping ring 23, the ring 23 is initially drawn up so that the plunger 12 is in contact with the outer crosshead 18, and the width of ring 23 is such that there will be a slight space between the ring 23 and the outer crosshead 18. This space, indicated at 26, is filled with shims 27, of any required thickness so that when ring 23 is tightly drawn, clamping shims between ring 23 and outer crosshead 18, the plunger 12 will be in contacting relation with respect to the outer crosshead 18.

With a construction as hereinbefore described, the plunger 12 may be slightly out of axial alignment with respect to the axis of bushing 13 so that if there are any slight inaccuracies in the machining or assembling of the related parts, with respect to the bore of bushing 13, the plunger 12 will nevertheless center itself in bore of bushing 13, in parallel relation to the connecting rods or operating members 19.

With a plunger connection as hereinbefore described, the outer end of the plunger may be secured to the outer crosshead at a point of production of the pump, or the plunger may be connected with the outer crosshead at the point of use. Furthermore, with a plunger connection as hereinbefore described, in the event it is necessary to renew any of the elements associated with the plunger or the plunger itself, such renewal can be readily made at a point of use and any slight inaccuracies can be overcome by the plunger connection hereinbefore described.

I do not mean to confine myself to the exact details of construction herein disclosed, but claim all variations falling within the purview of the appended claim.

What I claim is:

In a pump, a reciprocating plunger, a pair of plunger rods, an outer crosshead secured between said plunger rods, said reciprocating plunger having an annular groove adjacent said outer crosshead, a pair of ring segments engaging in said groove and projecting radially outwardly therefrom, the inner diameter of said ring segments being greater than the diameter of the bottom of said groove whereby said plunger may be disposed out of axial position with respect to said ring segments, a clamping ring, an internal shoulder at one end of said clamping ring, said clamping ring encompassing said ring segments and loosely surrounding said plunger with said shoulder of said clamping ring extending in contact with a radial face of each of said ring segments, and means securing said clamping ring to said outer crosshead with the end of said clamping ring opposite the end carrying said internal shoulder adjacent said crosshead.

References Cited in the file of this patent

UNITED STATES PATENTS

| | | |
|---|---|---|
| 123,584 | Shriver | Feb. 13, 1872 |
| 462,390 | Bisett | Nov. 3, 1891 |
| 539,072 | Mis | May 14, 1895 |
| 1,015,906 | Payen | Jan. 30, 1912 |
| 1,186,325 | Metzger | June 6, 1916 |
| 1,442,223 | Knebusch | Jan. 16, 1923 |
| 1,677,168 | Brown | July 17, 1928 |
| 1,909,004 | Parsons | May 16, 1933 |
| 2,451,342 | Kent | Oct. 12, 1948 |
| 2,633,085 | Hieger | Mar. 3, 1953 |

FOREIGN PATENTS

| | | |
|---|---|---|
| 455,726 | Canada | Feb. 3, 1943 |

OTHER REFERENCES

Ser. No. 418,664, Neugebauer (A. P. C.), published May 25, 1943.